US012188242B2

(12) United States Patent
Miller et al.

(10) Patent No.: US 12,188,242 B2
(45) Date of Patent: Jan. 7, 2025

(54) TAPPING BLOCK

(71) Applicant: Q.E.P. Co. Inc., Boca Raton, FL (US)

(72) Inventors: Bradley Scott Miller, Boca Raton, FL (US); Joseph Deguglimo, Boca RatonF, FL (US)

(73) Assignee: Q.E.P. Co. Inc., Boca Raton, FL (US)

( * ) Notice: Subject to any disclaimer, the term of this patent is extended or adjusted under 35 U.S.C. 154(b) by 323 days.

(21) Appl. No.: 17/712,250

(22) Filed: Apr. 4, 2022

(65) Prior Publication Data

US 2023/0313542 A1 Oct. 5, 2023

(51) Int. Cl.
*B25D 1/00* (2006.01)
*E04F 21/22* (2006.01)

(52) U.S. Cl.
CPC ................ *E04F 21/22* (2013.01); *B25D 1/00* (2013.01)

(58) Field of Classification Search
CPC ..... E04F 21/20; E04F 21/22; E04F 15/02038; E04G 21/16; E04G 21/165; B25D 1/00; B25D 17/005; B25D 17/04; B25D 17/06; B25D 17/24; B25D 17/28; B25D 17/02; B25B 27/02; B25G 1/00; B25F 1/00
See application file for complete search history.

(56) References Cited

U.S. PATENT DOCUMENTS 2,654,408 A * 10/1953 Leslie ........................ F16B 9/01 403/68
10,934,725 B2 3/2021 Suwyn
2005/0036837 A1* 2/2005 Marshall ................... B25F 5/00 404/114
2010/0180529 A1* 7/2010 Drannikov .............. E04F 15/02 52/749.11
2020/0102759 A1 4/2020 Apt
2020/0256069 A1* 8/2020 Suwyn ..................... E04F 21/20

FOREIGN PATENT DOCUMENTS

EP 1832694 A2 * 9/2007 .............. E04F 21/16
JP H07241782 * 9/1995

* cited by examiner

*Primary Examiner* — Robert J Scruggs
(74) *Attorney, Agent, or Firm* — Jerold I. Schneider; SCHNEIDER IP LAW

(57) ABSTRACT

An invertible tapping block having first and second opposed sides each configured to be struck with an impacting member, and a web between the sides, the web having upper and lower support surfaces to which a handle is selectively attached, and the web including opposed projections, different from each other, and configured to engage different configurations of flooring planks.

11 Claims, 6 Drawing Sheets

TAPPING BLOCK

BACKGROUND OF THE INVENTION

The present invention relates to a floor tapping block. More particularly, the present invention provides a floor tapping block for use in the installation of different types of flooring.

Consumers choose among different types of flooring such as vinyl, laminate, and engineered wood. Different types of flooring present different requirements for installation. The basic principles of flooring installation are well understood, starting with the first row of flooring against a wall and then pressing each subsequent plank against a previously installed plank and again using a tapping block and applying a force to the tapping block via a hammer or mallet.

Examples of the prior art use of tapping blocks for floor installation include U.S. Pat. No. 10,934,725 to Crain Cutter Company granted on Mar. 2, 2021, and U.S. Patent Publication 2020/0102759 to Apt, published on Apr. 2, 2020. The entirety of each of the above two documents are incorporated by reference.

One non-limiting example of a problem with prior art tapping blocks is that if the block has a flat bearing surface and the flooring planks rely on a form of interlocking, such as but not limited to a tongue and groove configuration, there is always the risk of damaging the exposed part of a plank when installing another plank against a previously installed plank.

Prior to the present invention, however, flooring installers who wanted to reduce the risk of damage when installing another plank against a previously installed plank used two different types of tapping blocks. Thus, prior to the present invention, flooring installers did not have the option of a single tapping block that could be used for the installation of various types of flooring such as tongue and groove, or clicklock, and flat or non-interlocking configuration.

SUMMARY OF THE INVENTION

The present invention provides an invertible floor tapping block that can be utilized for the installation of various types of flooring.

The invertible floor tapping block includes a first surface for contact with the edge of a first type of flooring plank and a second surface for contact with the edge of a second type of flooring plank. The tapping block includes a removable handle adapted to be installed in an offset position relative to the first and second contact surfaces to provide better balance and leverage during use. The ends or flat outer edges may also be used to push thicker flooring planks together.

The foregoing benefits of the present invention, together with other benefits and advantages that may be obtained by its use, will become more apparent upon reading the following detailed description taken in conjunction with the accompanying drawings.

DETAILED DESCRIPTION

The figures should be understood as being for purposes of illustration only. One skilled in the art will readily recognize from the following, that alternate embodiments of the tapping block, and their use, may be employed without departing from the principles described herein.

Figure 1:
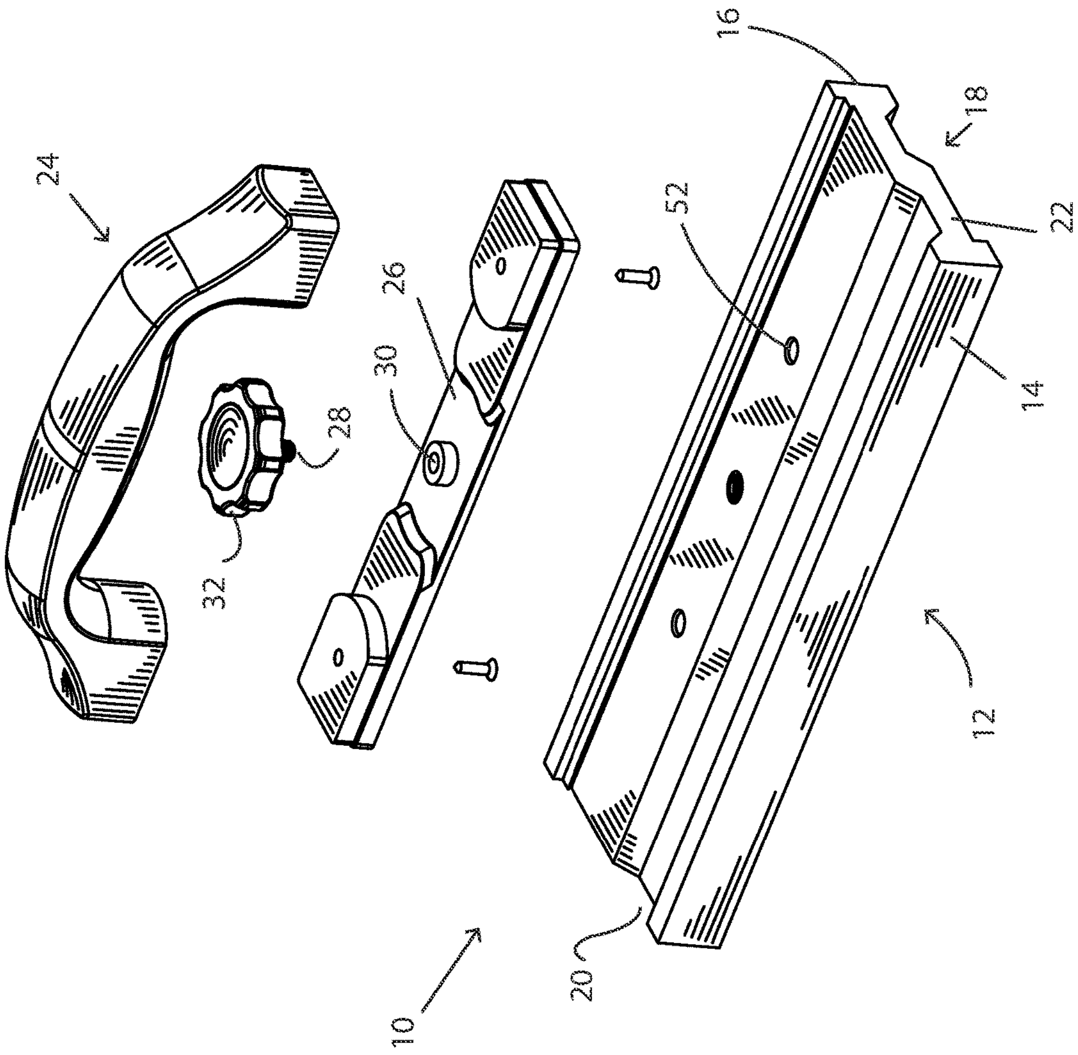
FIG. 1 is an exploded perspective view of the present tapping block.
Figure 2:
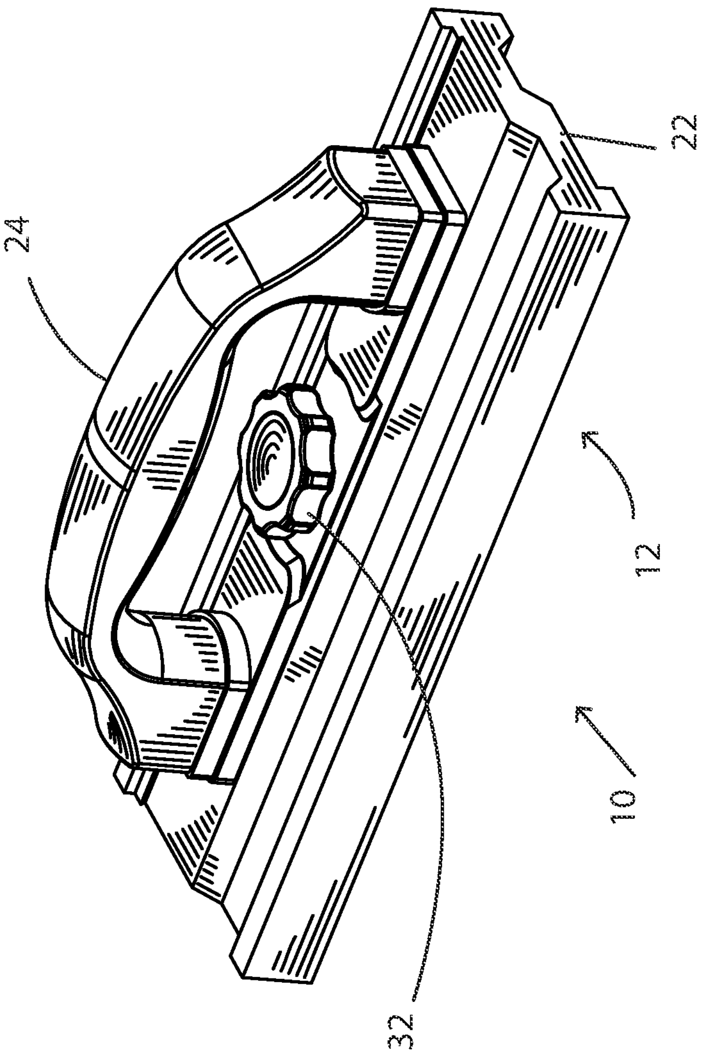
FIG. 2 is a perspective view of the present tapping block with the handle in a first position.

FIG. 1 and FIG. 2 illustrate a tapping block 10 having a generally rectangular base 12. The base 12 includes two elongated opposed sides 14, 16, and two opposed ends 18, 20. Each of the sides 14, 16 receives an impact from a hammer or mallet during flooring installation and may be referred to as “impact sides” for convenience. The base 12 includes a web 22 that interconnects the two sides 14, 16 and extends the full length of the base between the ends 18, 20.

A removable handle 24 is provided for the tapping block. The handle includes a base plate 26 which may be formed as a separate part or formed integrally as part of the handle. The handle including the base is generally “D” shaped. A threaded fastener 28 extends through an aperture 30 in the base plate. A knurled knob 32 is provided at one end of the fastener.

Figure 3:
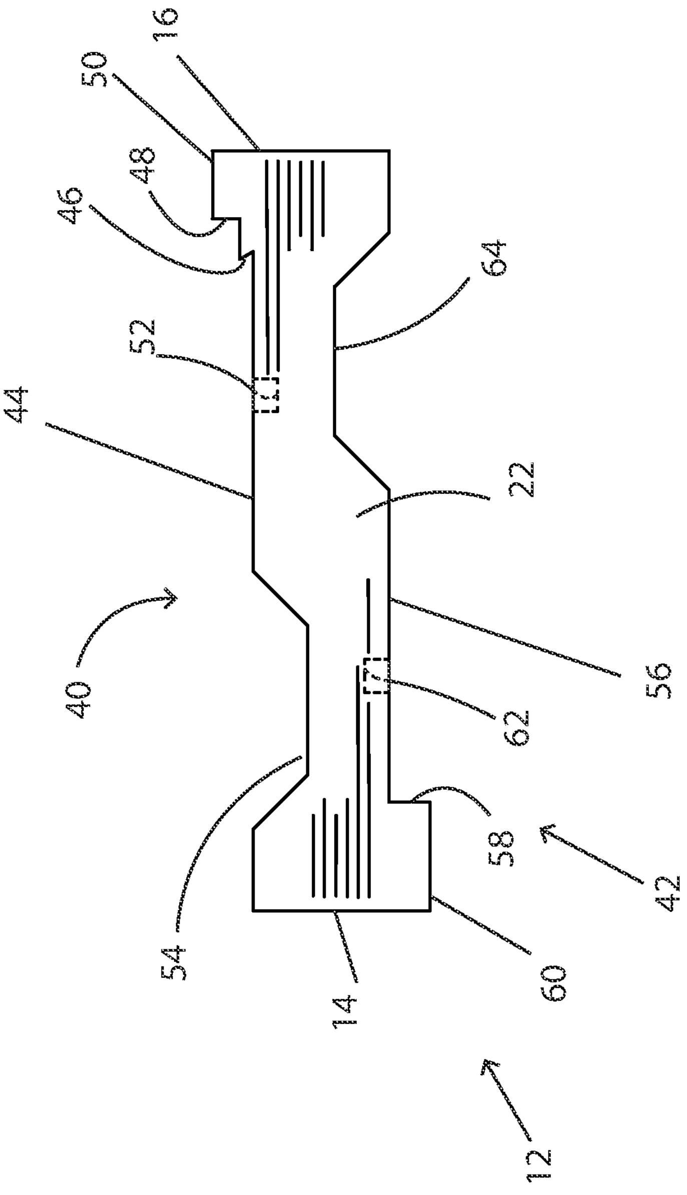
FIG. 3 is an enlarged end view of the present tapping block base.

The details of the web 22 will now be explained. Referring to FIG. 3, the web 22 includes opposed first and second faces 40, 42 extending between the sides 14, 16. The first face 40 includes a generally flat first support surface 44 extending about ⅔ of the distance from side 16 toward side 14. One end of the support surface 44 includes an upward and inward projection, thus forming a notch 46, above which is an abutting surface 48 generally perpendicular to the support surface 44. The abutting surface 48 terminates in a top 50 of the web 22 and the top 50 extends between the abutting surface 48 and the side 16.

The web 22 includes a threaded recess 52 extending down from the support surface 44 toward the second face 42 to receive the threaded fastener 28. The web first face 40 includes a recess 54 extending toward the side 14 and toward the second face 42.

The second face 42 of the web 22 will now be explained. The second face includes a generally flat support surface 56 extending about ⅔ of the distance from side 14 toward side 16. One end of the support surface 56 includes a downward portion (as viewed in FIG. 3) generally perpendicular to the support surface 56 forming a second abutting surface 58. The second abutting surface 58 terminates at a bottom 60 of the web 22 and the bottom 60 extends between the abutting surface 58 and the side 14.

The web includes a second threaded recess 62 extending up from the support surface 56 toward the first face 40. The web second face 42 includes a recess 64 extending toward side 16 and toward the first face 40.

The provision of each recess 54, 64 results in a thinner portion of the web, from top to bottom, thus reducing the weight of the web.

It should be appreciated that terms such as upward and downward are dependent on the orientation of the web 22 as will be better understood from consideration of all the Figures.

It should be appreciated that the tapping block may be used for all known types of flooring planks such as, but not limited to, flat edged non-interlocking, tongue and groove, and other types of interlocking planks.

Figure 4:
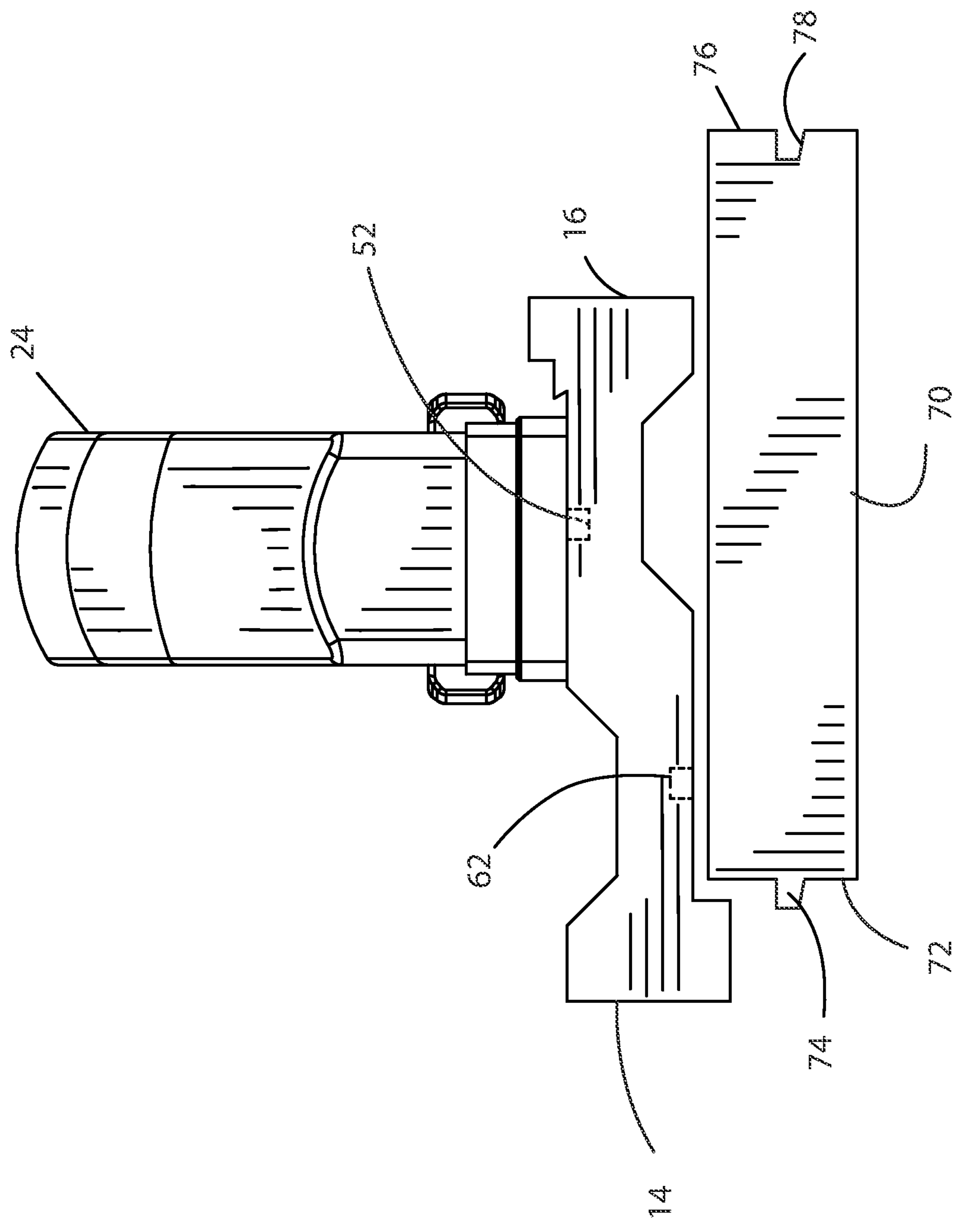
FIG. 4 is an end view of the present tapping block, partially exploded for clarity, configured to install a first type of flooring plank.

Referring next to FIG. 4, the assembly and use of the tapping block 10 with a first type of flooring plank 70 will now be explained. The flooring plank 70 includes a flat vertical surface 72 with a tongue 74 extending outwardly from that surface. The opposite surface 76 is also flat with a notch 78. The handle 24 is attached to the support surface 44 by tightening the screw 28 within the recess 52. It should be noted that the base 12 is oriented such that the handle 24 is attached on the opposite surface or face of the web when compared to the orientation of the vertical surface 58 of the base 12. Thus, the vertical surface 58 is able to engage the flat vertical surface 72 of the plank above the outwardly extending tongue 74. The use of a hammer or mallet on the first side 14 results in the vertical surface 58 pushing against the flat vertical surface 72 of the plank 70 to move the plank in a direction away from the first side 14 and to thus engage an adjacent plank (not shown). More specifically, if a first plank 70 has been installed and a second plank is to be installed, impacting the side 14 of the tapping block results in the tongue of the previously installed plank to be received within in groove 78. It should be noted that the recess 64 above the plank 70 results in two spaced-apart portions of the base 12 engaging the top of the plank 70. A benefit of the recess is to reduce the weight of the tapping block and another benefit is to accommodate irregularities in the upper surface of the plank 70.

Figure 5:
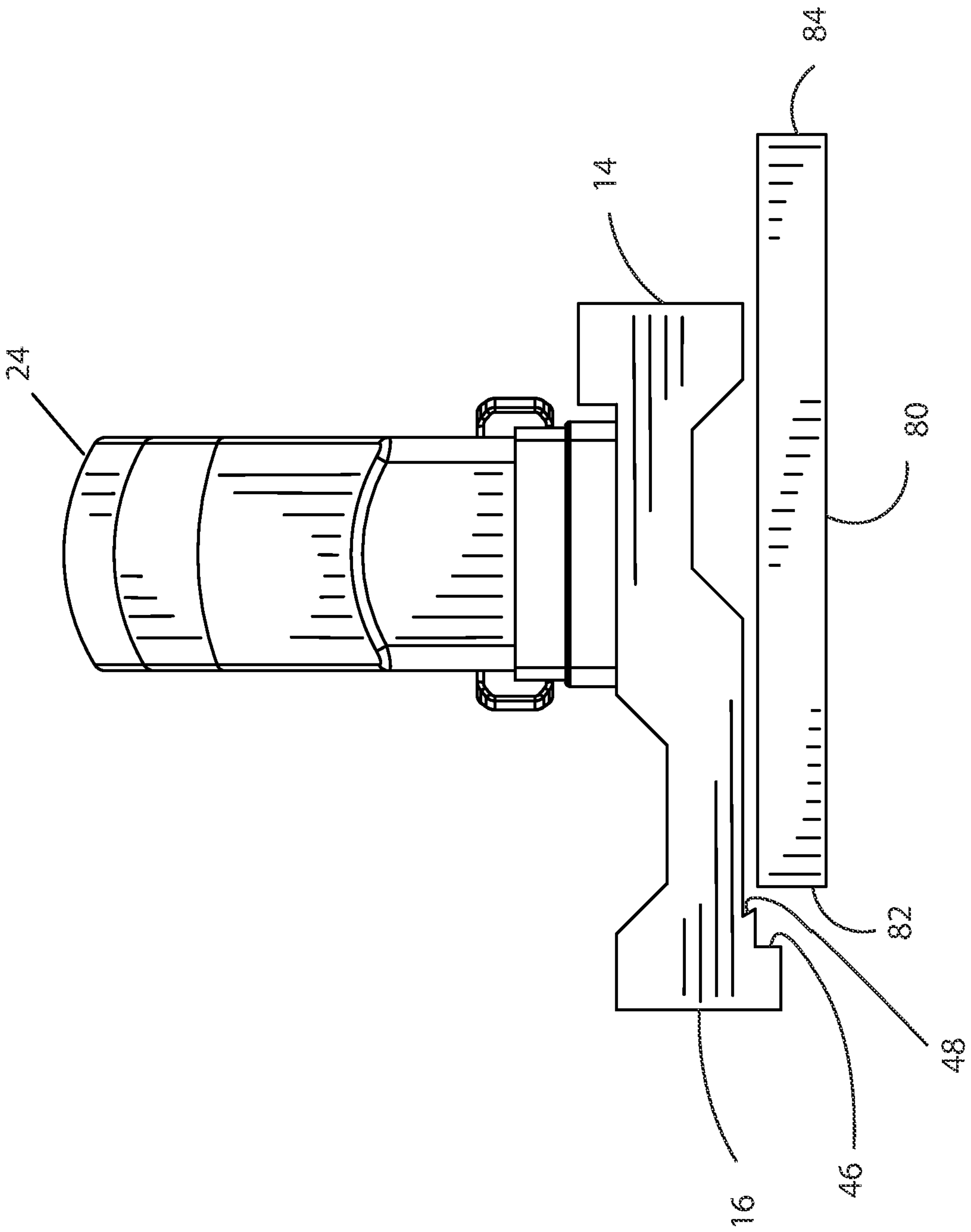
FIG. 5 is an end view of the present tapping block, partially exploded for clarity, configured to install a second type of flooring plank.

Referring next to FIG. 5 the assembly and use of the tapping block 10 with a second type of flooring plank 80 will now be explained. The flooring plank 80 is illustrated as having opposed flat edge 82, 84. To achieve this orientation of the tapping block, the handle 24 is removed from the support surface 44 in the orientation of FIG. 4, by loosening the screw 28. The base 12 is inverted, and the handle 24 is attached to the support surface 42 by tightening the screw 28 within the recess 62. It again should be noted that the handle 24 is attached on the opposite surface or face of the web when compared to the orientation of the notch 46 and vertical surface 48. The use of a hammer or mallet on the second side 16 results in the vertical surface 48 pushing against the vertical surface 82 of the plank in a direction away from the second side 16 and to thus engage an adjacent plank (not shown). If desired, the tapping block in the orientation of FIG. 4 may be used when the sides 82, 84 of the plank are flat.

Figure 6:
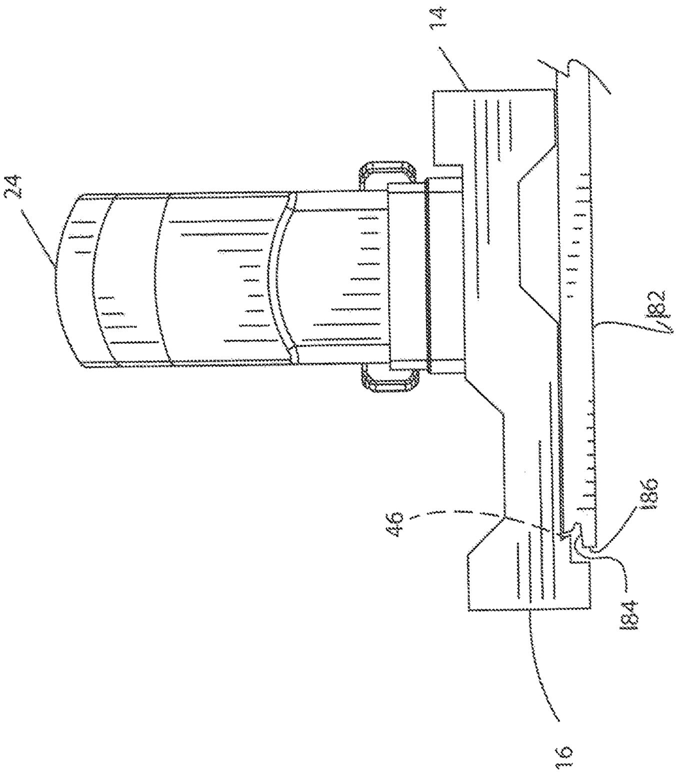
FIG. 6 is an end view of the present tapping block, partially exploded for clarity, configured to install a third type of flooring if the flooring plank.

FIG. 6 illustrates the tapping block in the same orientation as in FIG. 5 where the plank 182 has a vertical surface 186 with a notch 184. In this embodiment of FIG. 6, the notched portion of the tapping block 46, 48 engages the notched portion of the plank 184, 186, to move the plank into engagement with an adjacent plank (not shown) without damage to the notched portion of the plank.

The handle is secured to the flat surface (44 or 56) remote from the side (14 or 16) where the hammer or mallet will impact the tapping block. Thus, the handle is offset from the center of the tapping block, when viewed from the end, and is closer to the already-installed planks. This provides the benefit of allowing the weight of the user to be applied vertically on the plank being installed, to maintain the plank being installed as level or flat (when compared to the already-installed planks) as desired. The offset use of the handle also prevents excessive vertical forces from being applied to the plank being installed.

The foregoing is a complete descriptive of one embodiment of a tapping block. Many changes and modifications may be made by those of skill in the art without departing from the spirit and scope of the foregoing.

What is claimed is:

1. An invertible tapping block comprising:

an elongated rectangular base having first and second opposed sides each configured to be struck with an impacting member, the two opposed sides being interconnected by an elongated web;

the elongated web extending along a first axis perpendicular to the opposed first and second sides;

the web having opposed first and second faces generally parallel to said first axis, and vertically offset from each other on opposite sides of said first axis;

the web first face having a support surface extending from the first side toward the second side;

the web second face having a support surface extending from the second side toward the first side;

the web first face including a portion configured to be in contact with a first configuration of a flooring plank; and the web second face including a portion configured to be in contact with a second configuration of a flooring plank by inverting the elongated rectangular base about said first axis.

2. The invertible tapping block according to claim 1, wherein the first and second opposed sides are generally flat.

3. The invertible tapping block according to claim 1, wherein the first and second support surfaces are generally flat.

4. The invertible tapping block according to claim 1, wherein each of the first and second support surfaces include a threaded recess.

5. The invertible tapping block according to claim 4, wherein each threaded recess is offset relative to the opposed first and second sides.

6. The invertible tapping block according to claim 1, wherein said first and second flooring plank configurations are different from each other.

7. The invertible tapping block according to claim 1, and further including a handle removably selectively attachable to said first support surface and to said second support surface.

8. The invertible tapping block according to claim 1, wherein each of the first and second support surfaces include a threaded recess, and further including a handle removably selectively attachable to said first support surface and to said second support surface, said handle including a threaded fastener to selectively engage each threaded recess.

9. The invertible tapping block according to claim 8 wherein each threaded recess extends perpendicular to said first axis.

10. The invertible tapping block according to claim 1, wherein said first support surface extends along a second axis and said second support surface extends along a third axis, said second axis and said third axis are parallel to each other and parallel to said first axis.

11. The invertible tapping block according to claim 10, wherein said first and second flooring plank configurations are different from each other.

* * * * *